United States Patent
Park et al.

(10) Patent No.: US 12,044,822 B2
(45) Date of Patent: *Jul. 23, 2024

(54) FLEXIBLE GLASS-BASED COVER WINDOW HAVING SMALLER THICKNESS FOLDING PART

(71) Applicant: UTI INC., Chungcheongnam-do (KR)

(72) Inventors: Deok Young Park, Gyeonggi-do (KR); Jae Young Hwang, Gyeonggi-do (KR); Hak Chul Kim, Chungcheongnam-do (KR); Kukhyun Sunwoo, Gyeonggi-do (KR); Tea Joo Ha, Chungcheongnam-do (KR)

(73) Assignee: UTI Inc. (KR)

( * ) Notice: Subject to any disclaimer, the term of this patent is extended or adjusted under 35 U.S.C. 154(b) by 427 days.

This patent is subject to a terminal disclaimer.

(21) Appl. No.: 16/801,701

(22) Filed: Feb. 26, 2020

(65) Prior Publication Data

US 2020/0292731 A1   Sep. 17, 2020

(30) Foreign Application Priority Data

Mar. 11, 2019 (KR) .................. 10-2019-0027399

(51) Int. Cl.
  *G02B 1/11*  (2015.01)
  *G02B 1/14*  (2015.01)
  *G02B 1/18*  (2015.01)
  *G06F 1/16*  (2006.01)
  *G09F 9/30*  (2006.01)

(52) U.S. Cl.
  CPC ................. *G02B 1/14* (2015.01); *G02B 1/11* (2013.01); *G02B 1/18* (2015.01); *G06F 1/1609* (2013.01); *G06F 1/1641* (2013.01); *G06F 1/1652* (2013.01); *G09F 9/301* (2013.01); *G06F 1/1637* (2013.01); *G06F 2203/04102* (2013.01)

(58) Field of Classification Search
  CPC .... G02B 1/11; G02B 1/14; G02B 1/18; G02F 1/133305; G06F 1/1609; G06F 1/1641; G06F 1/1652; G06F 2203/04102; G09F 9/301; H01L 51/0097; H01L 2251/5338; H04M 1/0268
  See application file for complete search history.

(56) References Cited

U.S. PATENT DOCUMENTS 8,773,848 B2   7/2014   Russell-Clarke et al.
9,321,679 B2   4/2016   Chang et al.
(Continued)

FOREIGN PATENT DOCUMENTS

JP      2015512057 A    4/2015
KR   1020170122554 A   11/2017
(Continued)

*Primary Examiner* — Ryan S Dunning
(74) *Attorney, Agent, or Firm* — Mendelsohn Dunleavy, P.C.

(57) ABSTRACT

A cover window is provided, which is a flexible cover window, the cover window being a glass-based cover window for a flexible display and including: a folding part slimmed by corresponding to a folding area of the display, wherein a thickness ($t_2$) of the cover window is 50 to 300 μm and a thickness ($t_1$) of the folding part is 20 to 100 μm. The glass-based cover window has excellent strength and folding properties while maintaining the intrinsic texture of glass.

19 Claims, 4 Drawing Sheets

(56) References Cited

U.S. PATENT DOCUMENTS

| | | | |
|---|---|---|---|
| 10,014,352 B1* | 7/2018 | Tsai | H01L 27/323 |
| 2012/0154725 A1* | 6/2012 | Jeon | G06F 3/0446 |
| | | | 349/110 |
| 2012/0320509 A1* | 12/2012 | Kim | B32B 17/10 |
| | | | 361/679.01 |
| 2015/0086048 A1* | 3/2015 | Brown | B32B 17/10788 |
| | | | 381/152 |
| 2017/0020007 A1* | 1/2017 | Park | H01L 21/28 |
| 2017/0170417 A1* | 6/2017 | Myung | H10K 59/12 |
| 2018/0033979 A1* | 2/2018 | Jang | B32B 27/08 |
| 2018/0090698 A1* | 3/2018 | Jeong | H01L 51/003 |
| 2018/0155238 A1 | 6/2018 | Kim et al. | |
| 2019/0197924 A1* | 6/2019 | Jeon | H01L 51/5275 |
| 2019/0315099 A1* | 10/2019 | Baby | C03C 17/30 |
| 2019/0339741 A1* | 11/2019 | Park | H01L 27/322 |
| 2020/0117034 A1* | 4/2020 | Yin | H04N 7/142 |
| 2020/0212127 A1* | 7/2020 | Choi | H01L 27/3218 |
| 2020/0324521 A1* | 10/2020 | Park | B24B 7/24 |
| 2020/0329575 A1* | 10/2020 | Park | G02B 1/14 |
| 2020/0392038 A1* | 12/2020 | Park | C03C 21/002 |
| 2021/0104694 A1* | 4/2021 | Yee | H01L 51/56 |

FOREIGN PATENT DOCUMENTS

| | | |
|---|---|---|
| KR | 20180063940 A | 6/2018 |
| KR | 20190022934 A | 3/2019 |

\* cited by examiner

ND SMALLER THICKNESS FOLDING
FLEXIBLE GLASS-BASED COVER WINDOW HAVING SMALLER THICKNESS FOLDING PART

CROSS REFERENCE TO RELATED APPLICATION

The present application claims priority to Korean Patent Application No. 10-2019-0027399, filed Mar. 11, 2019, the entire contents of which is incorporated herein for all purposes by this reference.

BACKGROUND OF THE INVENTION

Field of the Invention

The present invention generally relates to a glass-based cover window. More particularly, the present invention relates to a flexible cover window in which strength and folding properties are secured while the intrinsic texture of glass is maintained.

Description of the Related Art

Recently, electric and electronic technologies have been rapidly developed, and various types of display products are released to meet demands of a new era and various consumer demands. Among them, research on a flexible display in which the screen can be folded and unfolded is active.

The research on the flexible display is being conducted by bending, rolling, and stretching the display, fundamentally starting from folding the display. In addition to a display panel, a cover window protecting the display panel is also required to be formed flexibly.

Such a flexible cover window is required to fundamentally have excellent flexibility, and to have no marks on a folding part and no distortion of image quality even after being repeatedly folded.

The cover window of a conventional flexible display has used a polymer film such as a PI or PET film on a display panel surface.

However, since such a polymer film is weak in mechanical strength, the polymer film serves only to prevent scratches of the display panel and is vulnerable to external impacts. Furthermore, the polymer film has a low transmittance and is known to be relatively expensive.

In addition, in the case of the polymer film, as the number of times the display is folded increases, marks remain on the folding part, which inevitably damages the folding part. For example, the polymer film is pressed or torn during folding limit evaluation (usually 200,000 times).

Recently, a research on a glass-based cover window has been conducted to overcome the limitation of the cover window provided with the polymer film.

As a prior art for such a glass-based cover window, there is "Foldable display device" (Korean Patent Application Publication No. 10-2017-0122554), which provides a cover window formed to be thin in a folding part.

The cover window according to the prior art is formed to become thicker as distance from a folding line defined as having the minimum thickness increases. That is, the folding part of the cover window according to the prior art in which a minimum thickness area is defined as a line shows a curved shape.

As for the prior art, the minimum thickness area of the folding part appears as a relatively small line (the folding line). In this case, when folding is repeated, thick parts break during the folding.

As for the folding part having a curved shape, it is not easy to align its center during mechanical assembly, so assembly tolerances may occur, which may result in deterioration of product quality and quality difference between products.

As for the prior art, the folding part having the thin portion formed in the cover window is bonded to the display panel, which is a flat plate. In this case, space (an air layer) is formed between the folding part and the surface of the display panel, which causes the problem of distortion of image quality due to difference in a refractive index between glass and the air layer. Furthermore, the folding part is damaged due to the pressure of a touch pen or is lowered in durability since a bonding force between portions adjacent to the folding part and the display panel is decreased.

Accordingly, the glass-based cover window is required to satisfy the folding properties and fundamentally required properties such as no distortion of image quality and sufficient strength to withstand the repeated touching and certain pressure of a touch pen. To satisfy the strength property of the cover window, the glass is required to have at least a predetermined thickness, and to satisfy the folding properties, the glass is required to have a predetermined thickness or less. Accordingly, research on the thickness and structure of an optimum cover window, which satisfies the folding properties while satisfying the strength property and has no distortion of image quality, is needed.

Furthermore, when glass has a predetermined thickness or less, intrinsic texture of tempered glass decreases, so this is also required to be taken into account.

Accordingly, a technique for providing the cover window is needed, in which appropriate thickness is maintained to secure strength while maintaining the intrinsic texture of tempered glass and the folding properties are also satisfied.

SUMMARY OF THE INVENTION

Accordingly, the present invention has been made keeping in mind the above problems occurring in the related art, and the present invention is intended to propose a flexible cover window in which strength and folding properties are secured while the intrinsic texture of glass is maintained.

In order to achieve the above object, according to one aspect of the present invention, there is provided a flexible cover window, the cover window being a glass-based cover window for a flexible display and including: a folding part slimmed by corresponding to a folding area of the display, wherein a thickness ($t_2$) of the cover window is 50 to 300 μm and a thickness ($t_1$) of the folding part is 20 to 100 μm.

In addition, the folding part may be provided on a surface or opposite surfaces of the cover window, and when the folding part is provided on the opposite surfaces of the cover window, depths of the folding parts may be configured to be the same or different.

Here, the folding part of a back surface of the cover window may be configured to be deeper.

Furthermore, the folding part may be provided to be uniform in the thickness in a folding area of the cover window, and additionally, a buffer part may be provided on opposite ends of the folding part, the buffer part having thickness of gradually becoming larger from the folding part and continuing to a plane area of the cover window.

In addition, inclination of the buffer part may be 1~50° relative to the folding part.

Furthermore, the cover window may satisfy a minimum curvature radius of 0.5 to 2.5 mm during folding.

Additionally, a width $W_1$ of the folding part may be 3.0 to 8.0 mm.

Here, slimming of the folding part may be performed by any one process of wet etching, polishing, laser forming, and masking processes, by a process of combining the at least two process thereof, or by the wet etching, the laser forming, or the masking process, which is followed by the polishing process.

Meanwhile, the folding part may be filled with a transparent resin material so that the cover window is bonded to a total surface of a display panel without an empty space therebetween. Additionally, the folding part may be filled with the transparent resin material, and a total surface of the cover window is continuously coated with the transparent resin material to an upper side of the folding part. Furthermore, the transparent resin material may be an optical clear resin (OCR).

In addition, when the folding part is provided on the opposite surfaces of the cover window, the transparent resin material, with which the folding part of the back surface of the cover window is filled, may be provided as a material softer than the transparent resin material, with which the folding part of a front surface thereof is filled.

Furthermore, the functional coating layer may be provided in a single layer or multiple layers on the surface or opposite surfaces of the cover window.

In addition, a functional coating layer provided on a front surface of the cover window may be embodied as a strength reinforcement layer, and a functional coating layer provided on the back surface of the cover window may be embodied as an elastic reinforcement layer.

Additionally, when the functional coating layer provided on the front surface of the cover window is provided in multiple layers, the functional coating layer may be formed of a material getting harder upward. Furthermore, a functional coating layer provided on an uppermost layer may be given an anti-finger (AF) or an anti-reflective (AR) function.

In addition, a bonding film may be further provided on the surface or opposite surfaces of the cover window, and the bonding film may be an anti-splinter film (ASF).

According to the present invention, the flexible cover window as a glass-based cover window includes the folding part slimmed by corresponding to a folding area of the display, wherein the thickness $t_2$ of the cover window is 50~300 μm and the thickness $t_1$ of the folding part is 20~100 μm, thereby having excellent strength and folding properties while maintaining the intrinsic texture of glass.

That is, the flexible cover window has high transmittance due to optical properties unique to glass, and can resist scratches and absorb external impact due to the securing of mechanical strength, so that a display panel has excellent visibility and impact resistance.

In addition, the folding part of the flexible cover window according to the present invention is filled with the transparent resin material to have no gap between the folding part and the total surface of the display. Accordingly, the distortion of display image quality can be minimized, and the decrease of touch response speed and the decrease of bonding strength between the display and the cover window can be solved.

Furthermore, the flexible cover window of the present invention has the folding part having uniform thickness and has the portion of the minimum thickness formed widely therein so that folding properties such as flexibility, resilience, and elasticity can be further improved, and the assembly tolerances between the cover window and the display panel can be minimized, thereby minimizing quality differences between products.

Additionally, the flexible cover window of the present invention has improved strength and folding properties while being thin and can be used to protect a clear polyimide (CPI) by being disposed thereon.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Figure 1:
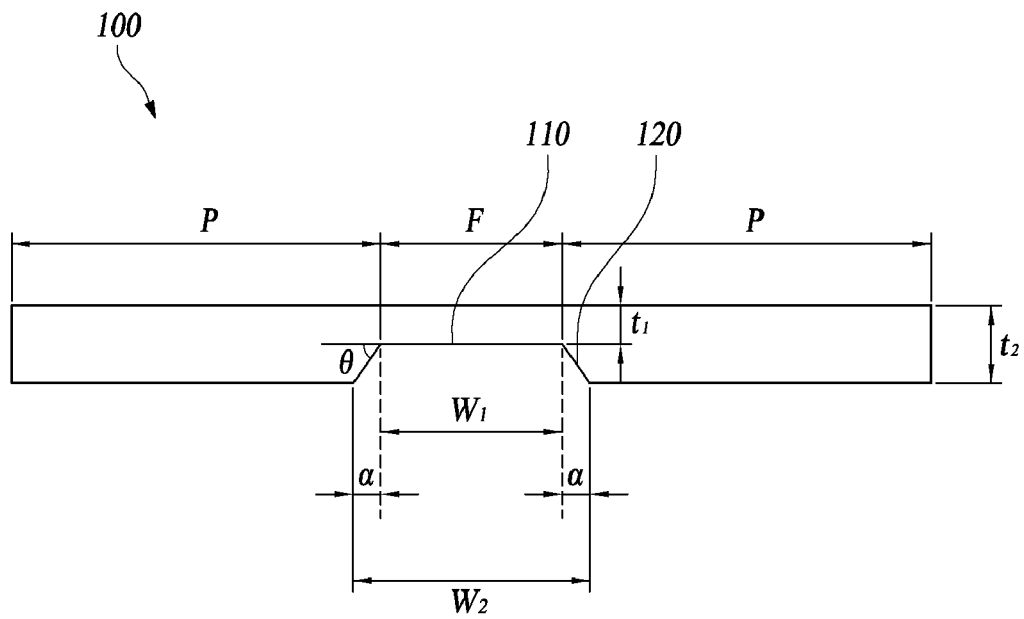
FIGS. 1 to 10 are views illustrating various embodiments of a flexible cover window according to the present invention.

The present invention generally relates to a glass-based cover window. More particularly, the present invention relates to a flexible cover window in which strength and folding properties are secured while the intrinsic texture of tempered glass is maintained.

Hereinbelow, embodiments of the present invention will be described with reference to the accompanying drawings. FIGS. 1 to 10 are views illustrating various embodiments of the flexible cover window according to the present invention.

As illustrated in the drawings, the cover window 100 for a flexible display according to the present invention is a glass-based cover window for flexible display, and includes a folding part 110 slimmed by corresponding to a folding area of the display, wherein a thickness $t_2$ of the cover window 100 is 50~300 μm and a thickness $t_1$ of the folding part 110 is 20~100 μm.

Here, the folding area of the display refers to an area in which the display is folded or bent in half; an area in which the cover window 100 is folded by corresponding to the area is referred to as "a folding area" F of the cover window in the present invention; and an area except for the folding area F, for convenience, is referred to as the "a plane area" P of the cover window.

In addition, in the cover window of the present invention, "a front surface" refers to a surface which a user sees or touches, and "a back surface" refers to a surface opposite thereto. Furthermore, "a total surface" refers to a surface of an entire area, and in the present invention, "a total surface of a display panel" usually refers to a surface of an entire area of the front surface of the display panel.

Accordingly, the present invention provides the cover window which is provided on the total surface of the display panel to maintain the folding properties while protecting the display panel. Furthermore, the cover window according to the present invention can be used to protect a clear polyimide (CPI) cover by being disposed on the CPI cover.

Figure 2:
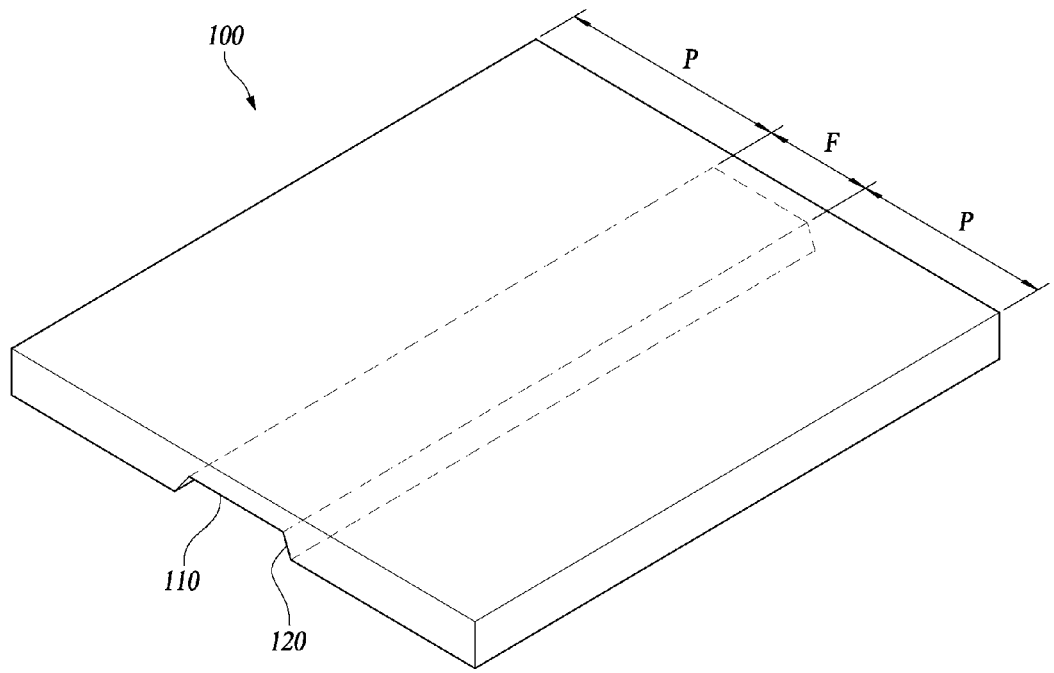

As illustrated in FIGS. 1 and 2, the cover window according to the present invention 100 is made of glass, and includes the folding part 110 formed to be thinner than other areas by being slimmed by corresponding to the folding area of the display. That is, the folding part 110, which is slimmed, is formed in the folding area F of the cover window 100.

Here, the folding part 110 is formed in the shape of a straight line such that the thickness of the folding area F of the cover window 100 is uniform, that is, the thickness thereof does not change.

This further improves the folding properties compared to a conventional technology in which a conventional folding part is formed in a curved shape. When the folding part 110 has the curved shape, the range of minimum thickness is relatively small. Accordingly, when folding is repeated, the folding properties deteriorates, so breaking occurs at a thick portion during folding. However, when the folding part 110 is formed to be uniform in entire thickness, that is, is formed in the shape of a straight line to have the same thickness as in the present invention, an area having the minimum thickness is widely formed so as to improve flexibility, resilience, and elasticity, so that the folding properties are improved.

In addition, when the conventional curved folding part is assembled mechanically, it is not easy to align the center thereof. However, the folding part 110 according to the present invention is formed to have the uniform thickness. Accordingly, when the folding part 110 is assembled mechanically, that is, when the cover window 100 is bonded to the total surface of the display panel, assembly tolerances can be reduced, so quality difference between products can be minimized and defect rates can be reduced.

Here, slimming of the folding part is preferably performed by any one process of wet etching, polishing, laser forming, and masking processes, the masking process using a masking ink or a dry film photo resist (DFR), by a process of combining the at least two process thereof, or by the wet etching, the laser forming, or the masking process, which is followed by the polishing process.

Here, a width $W_1$ of the folding part 110 is designed in consideration of a curvature radius of the cover window 100 when the cover window 100 is folded, and is roughly set as the curvature radius $R \times \pi$, and the thickness $t_1$ of a cover window 100 positioned in the folding part 110 is formed to be 20~100 μm. The thickness $t_1$ is set by a depth of the folding part 110.

When the depth of the folding part 110 is excessively deep, that is, when the folding area F of the cover window 100 is excessively thin, folding properties thereof are good, but wrinkles occur when the cover window 100 is tempered, or strength is decreased in the folding area F. However, when the folding area F of the cover window 100 is excessively thick, the flexibility, resilience, and elasticity of the folding area F are decreased and thus the folding properties are deteriorated. Accordingly, the thickness of the cover window 100 positioned in the folding part 110 is preferably 20~100 μm.

The cover window 100 of the present invention, which is based on glass, is formed to have the thickness $t_2$ of about 50~300 μm, and is used after chemical tempering treatment. In the thickness, the width and the depth of the folding part 110 as described above are properly designed. When the thickness of the cover window 100 is smaller than the thickness described above, the thickness of the folding area F of the cover window 100 is excessively thin after the forming of the folding part 110, so the above-described problems occur. However, when the thickness of the cover window 100 is larger than the thickness described above, flexibility, resilience, and elasticity thereof are decreased since the cover window 100 is based on glass as described above, and it is difficult to lighten display products.

The folding part 110 is formed in the shape of being slimmed inward from the folding area F of the cover window 100 and has the shape of a rectangular trench as a whole. A buffer part 120 may be provided on opposite ends of the folding part 110, the buffer part having thickness of gradually becoming larger from the folding part 110 and continuing to the plane area P of the cover window 100.

Inclination θ of the buffer part 120 preferably has a range of 1~50° relative to the folding part 110, and more preferably, has a range of 3~20°.

That is, the folding part 110 is preferably formed in a trapezoidal shape, not a rectangular shape. This is to gradually buffer stress occurring due to thickness difference between the folding area F and the plane area P of the cover window 100 when folding is repeated. In consideration of this, the inclination of the buffer part 120 is set.

Here, the width α of the buffer part 120 is represented by $\{(t_2-t_1)/2\}/\tan θ$, and the entire width $W_2$ of the folding part 110 and the buffer part 120 is produced by summing the width $W_1$ of the folding part 110 and the width 2α of the buffer part 120 at each of opposite sides. This is summarized in the following equation.

$$W_1 = R \times \pi$$

$$W_2 = W_1 + 2\alpha$$

$$\alpha = \{(t_2-t_1)/2\}/\tan θ$$

$$θ = 1\sim50°$$

Here, $W_1$ refers to the width of the folding part 110, R refers to a minimum curvature radius of the cover window 100 when the cover window 100 is folded, $W_2$ refers to a value produced by summing the width of each of the folding part 110 and the buffer part 120, α refers to the width of the buffer part 120, and θ refers to the inclination of the buffer part 120.

Accordingly, the cover window 100 of the present invention based on glass is formed to have the thickness $t_2$ of about 50~300 μm, and is used after the chemical tempering treatment. In the thickness, the thickness $t_1$ of the cover window 100 positioned in the folding part 110 is formed to be 20~100 μm, and the inclination θ of the buffer part 120 is 1~50° (preferably, 3~20°) relative to the folding part 110, and the width $W_1$ of the folding part is 3.0 to 8.0 mm. This is an optimal design for securing the thickness of the glass such that the intrinsic texture of the tempered glass is maintained and for securing the strength and the folding properties thereof at the same time.

Figure 3:
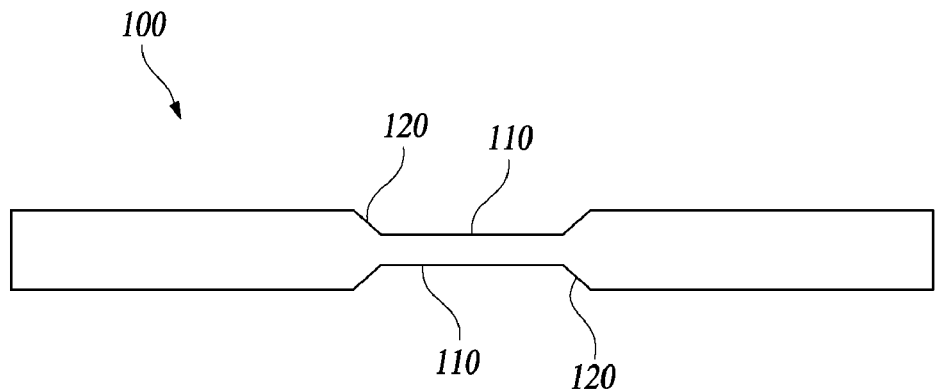

Meanwhile, the folding part 110 may be formed on a surface of the cover window 100, and as illustrated in FIG. 3, the folding part 110 may be formed on opposite surfaces of the cover window 100. This is determined by choice according to display product specifications.

Particularly, when the folding part 110 is formed on the opposite surfaces of the cover window 100, the depths of the folding parts 110 may be configured to be the same or different. Preferably, the folding part 110 of the back surface of the cover window 100 is configured to be deeper.

That is, the folding part 110 of the back surface is formed to be deeper than the folding part 110 of the front surface of the cover window 100 which a user touches, so the strength and the folding properties are secured and the feeling of physical touch and discomfort of the user are minimized.

Figure 4:
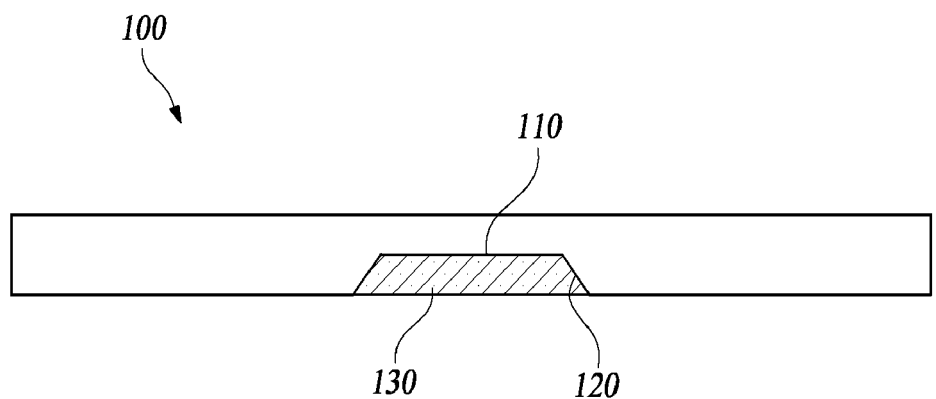

In addition, as illustrated in FIG. 4, the folding part 110 of the present invention is filled with a transparent resin material 130, so that the cover window is bonded to the total surface of the display panel without an empty space therebetween.

That is, the folding part 110 is filled with the transparent resin material 130 to provide the cover window 100 being uniform in entire thickness, so that there is no empty space (an air layer) when the cover window 100 is bonded to the total surface of the display panel.

As for the conventional cover window, there is a gap (an air layer) between the conventional cover window and the total surface of the display panel. Accordingly, the distortion of image quality due to difference in a refractive index between glass and the air layer, the decrease of touch response speed, and the decrease of bonding strength between the display panel and the cover window relative to the gap occur.

In the present invention, the folding part 110 is filled with the transparent resin material 130 having a refractive index almost identical to a refractive index (1.5) of glass, so all the above problems can be solved.

The transparent resin material 130 is an optical clear resin (OCR). For example, acrylic, epoxy, silicone, urethane, urethane compound, urethane acryl compound, hybrid sol gel, and siloxane family may be used. The combination of the resin materials is variously performed according to characteristics of the resin materials and can be used for reinforcing strength and elasticity.

Figure 5:
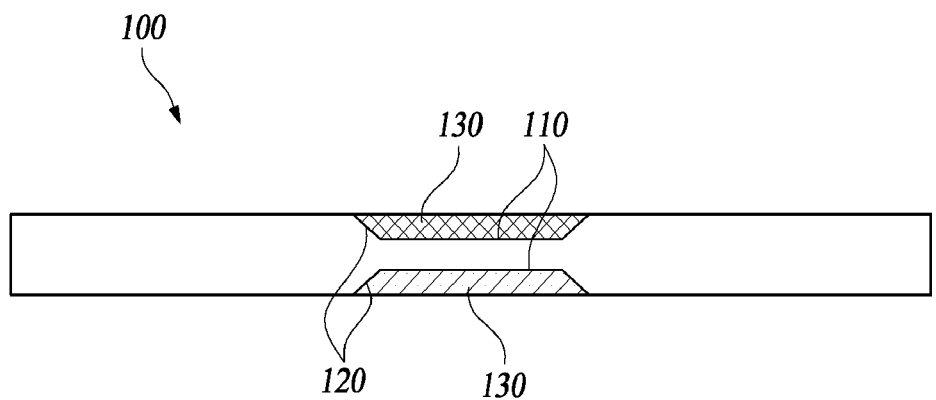

Furthermore, as illustrated in FIG. 5, when the folding part 110 is formed on the opposite surfaces of the cover window 100, the transparent resin material 130, with which the folding part 110 of the back surface (a stretching portion) of the cover window 100 is filled, is preferably provided as a material softer than the transparent resin material 130, with which the folding part 110 of a front surface (a folded portion) thereof is filled.

The folded portion is formed of a hard material by filling the portion which a user touches with the transparent resin material 130, which is a relatively hard material to maintain durability, and the stretching portion is formed of a relatively soft material to minimize cracks at the stretching portion.

Figure 6:
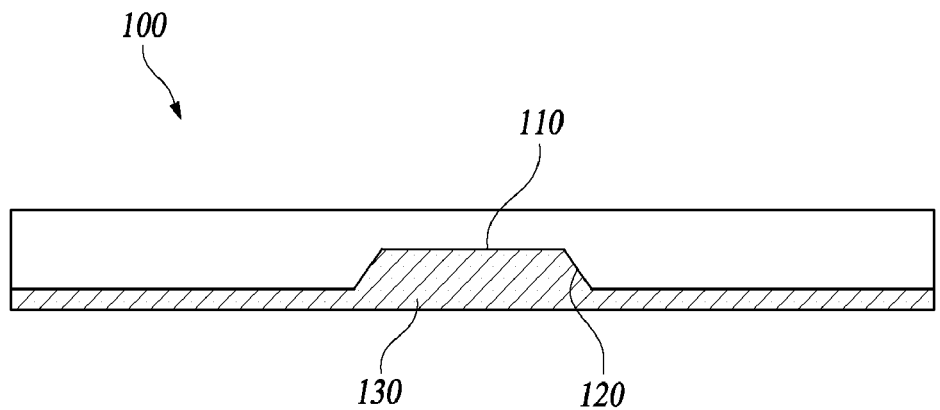
Figure 7:
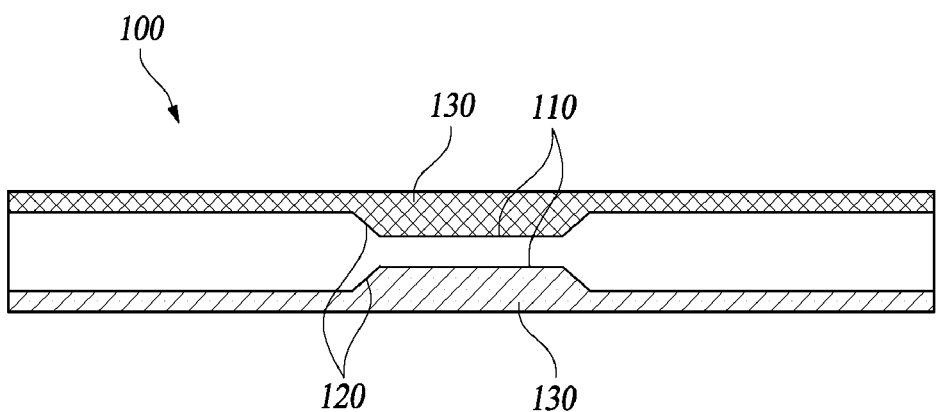

In addition, as illustrated in FIGS. 6 and 7, the folding part is filled with the transparent resin material 130 and the total surface of the cover window 100 may be continuously coated with the transparent resin material 130 to an upper side of the folding part.

This is to prevent crack from occurring in the folding area, to minimize the visibility of the shape of the folding part from the outside, and to secure flatness of a portion in contact with the display panel by allowing the folding part to be filled with the transparent resin material 130. Furthermore, the cover window 100 has an elastic force reinforced on a surface in contact with the display panel, thereby having improved impact resistance and the function of preventing the splintering of glass when the glass is broken.

Figure 8:
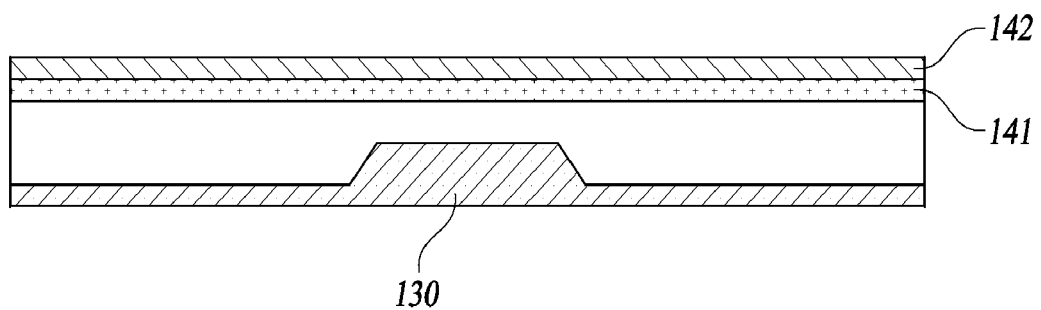
Figure 9:
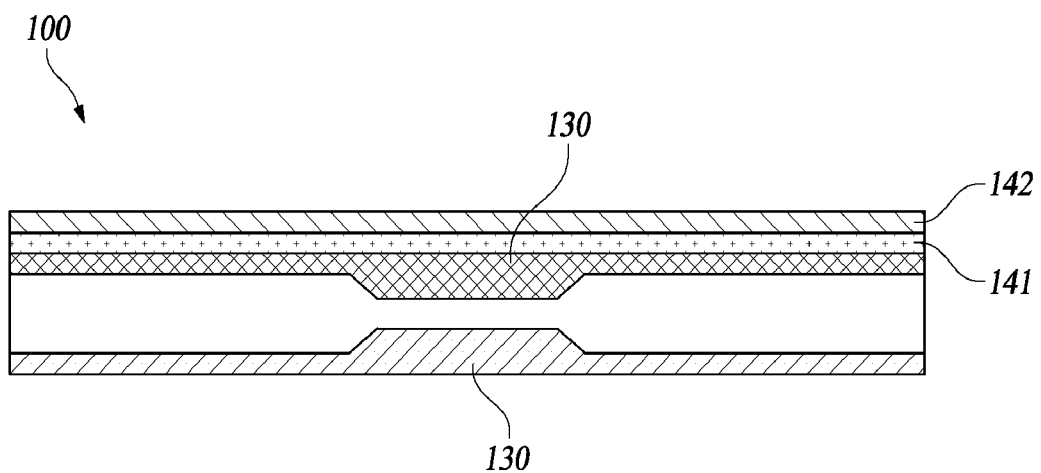

Meanwhile, as illustrated in FIGS. 8 and 9, a functional coating layer may further be provided on the surface or the opposite surfaces of the cover window 100. The functional coating layer is formed of a transparent material such as the transparent resin material 130 described above and has functionality by synthesizing a resin having a variety of properties.

When the folding part is filled with the transparent resin material 130 or when the folding part and the total surface of the cover window 100 are coated with the transparent resin material 130, the functional coating layer may be formed on an upper layer thereof. This can be formed by a known resin coating method such as spraying, dipping, and spin coating.

The functional coating layer can be formed in a single layer or multiple layers. The functional coating layer formed on the front surface of the cover window 100 may be embodied as a strength reinforcement layer, and the functional coating layer formed on the back surface of the cover window 100 may be embodied as an elastic reinforcement layer.

That is, since the front surface of the cover window 100 is touched, the functional coating layer having a reinforced strength may be embodied in the front surface. The functional coating layer having a reinforced elasticity may be embodied on the back surface of the cover window 100 to perform buffering between the back surface and the display panel.

The strength reinforcement layer (hard coating) of the front surface of the cover window 100 uses resin having relatively high hardness when the resin is hardened, for example, resin having a high content of resin such as acrylic or epoxy, and the elastic reinforcement layer (soft coating) of the back surface of the cover window 100 uses resin having relatively high elasticity when the resin is hardened, for example, resin having a high content of silicone or urethane synthetic resin. Furthermore, strength or elasticity is reinforced to be used by controlling the content of organic and inorganic materials in organic-inorganic hybrid sol-gel.

In addition, when the functional coating layer provided on the front surface of the cover window 100 is provided in multiple layers, the functional coating layer is preferably formed of a material getting harder upward.

FIGS. 8 and 9 illustrate a case in which the functional coating layer formed on the front surface of the cover window 100 is formed in two layers. The second functional coating layer 142 is formed of a material harder than a material of the first functional coating layer 141.

In addition, the functional coating layer, particularly, a functional coating layer formed on an uppermost layer may be given an anti-finger (AF) or an anti-reflective (AR) function, and may be embodied by synthesizing a resin having such a function or by forming various patterns, for example, patterns such as moth eyes on the functional coating layer.

Accordingly, since the cover window 100 according to the present invention fundamentally uses thin glass, the cover window 100 has the functional coating layer formed additionally thereon to reinforce strength and elasticity, so the cover window 100 can be protected from external impacts or the pressure of a touch pen.

In addition, the functional coating layer further prevents cracking in the folding area, and reinforces the elastic force of the cover window 100 on a surface in contact with the display panel, thereby functioning to improve impact resistance and prevent splintering.

Figure 10:
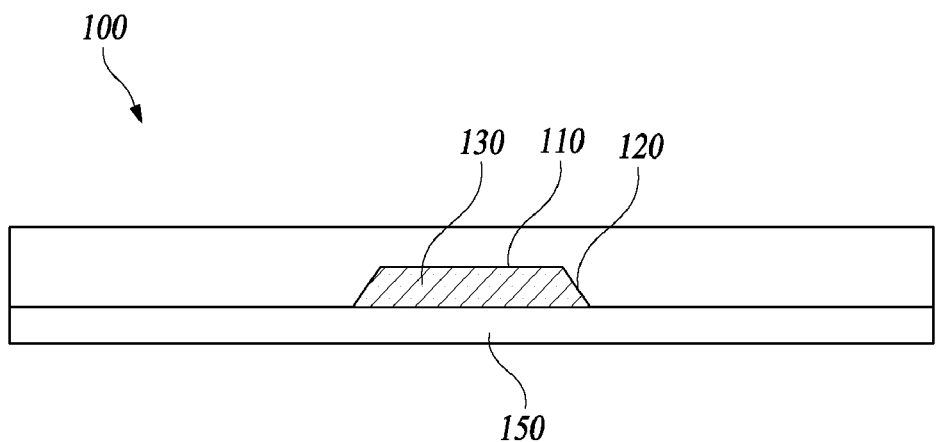

Meanwhile, according to the present invention, as illustrated in FIG. 10, a bonding film 150 is further provided on the surface or opposite surfaces of the cover window 100. The bonding film 150 and the cover window 100 are bonded to each other by an optical clear adhesive (OCA). The bonding film 150 may be provided on the front surface or the back surface of the cover window 100, and may be provided on the opposite surface thereof. The bonding film 150 may be provided on an upper layer of the functional coating layer, and may displace the functional coating layer.

The bonding film 150 is formed to have the thickness of 0.025 mm~0.150 mm, and can be used as an anti-splinter film (ASF) in the present invention.

The bonding film 150 is used to improve the physical properties of the cover window 100 so that flexibility and impact resistance are improved.

That is, the cover window 100 made of glass functions as shape maintenance due to the improvement of flexibility, resilience, elasticity, and mechanical strength, and the bonding film 150 functions to improve impact resistance due to elastic protection while compensating for bendability.

Such a bonding film 150 is any one of polycarbonate (PC), polyacrylate (PA), polyvinylalcohol (PVA), polyimide (PI), and polyethylene terephthalate (PET), which are transparent materials.

In addition, when the bonding film 150 is formed on the front surface of the cover window 100 as necessary, the bonding film may have functionality by receiving any one of AR treatment and AF treatment or combination thereof.

The following table 1 shows the curvature radius R of the cover window according to the present invention, that is, a curvature radius of the folding area when folding the cover window, and shows the folding properties best.

Table 1 shows curvature radius data according to the thickness based on 95% pass during folding test 200,000 times, and the cover window of the present invention is shown to have excellent folding properties.

TABLE 1

| Curvature radius R | Thickness $t_1$ of folding part |
|---|---|
| 0.8 mm | 20 μm |
| 1.3 mm | 30 μm |
| 1.7 mm | 40 μm |
| 1.9 mm | 45 μm |
| 2.1 mm | 50 μm |

As described above, the flexible cover window according to the present invention as a glass-based cover window includes the folding part slimmed by corresponding to the folding area of the display, wherein the thickness $t_2$ of the cover window 100 is 50~300 μm and the thickness $t_1$ of the folding part 110 is 20~100 μm. The flexible cover window has excellent strength and folding properties while maintaining the intrinsic texture of glass.

In addition, the folding part of the flexible cover window according to the present invention is filled with the transparent resin material to have no gap between the folding part and the total surface of the display. Accordingly, the distortion of display image quality can be minimized, and the deterioration of touch response speed and the decrease of bonding strength between the display panel and the cover window can be solved.

Furthermore, the flexible cover window of the present invention has the folding part having uniform thickness and has the portion of the minimum thickness formed widely therein so that folding properties such as flexibility, resilience, and elasticity can be further improved, and the assembly tolerance between the cover window and the display panel can be minimized.

Additionally, the flexible cover window of the present invention has improved strength and folding properties while being thin and can be used to protect a clear polyimide (CPI) by being disposed thereon.

What is claimed is:

1. A flexible cover window, the cover window being a glass-based cover window for a flexible display and comprising:
    two plane areas and a folding part having a thickness less than each of the plane areas, the folding part corresponds to a folding area of the display when used with the display, and a buffer part provided on opposite ends of the folding part, the buffer part having thickness that gradually becomes larger from the folding part and continues to each of the plane areas of the cover window,
    wherein a thickness ($t_2$) of the plane area of the cover window is 50 to 300 μm and a thickness ($t_1$) of the folding part is 20 to 100 μm,
    wherein the folding part is provided on opposite surfaces of the glass-based cover window, and the folding part of a back surface of the glass-based cover window is configured to be deeper than a front surface of the glass-based cover window, wherein the thickness ($t_1$) is set by a depth of the folding part of the back surface and a depth of the folding part of the front surface of the glass-based cover window, and
    wherein the two plane areas and the folding part are made of glass.

2. The cover window of claim 1, wherein the folding part is provided to be uniform in the thickness in a folding area of the cover window.

3. The cover window of claim 1, wherein inclination of the buffer part is 1~50° relative to the folding part.

4. The cover window of claim 1, wherein the cover window satisfies a minimum curvature radius of 0.5 to 2.5 mm during folding.

5. The cover window of claim 1, wherein a width ($W_1$) of the folding part is 3.0 to 8.0 mm.

6. The cover window of claim 1, wherein formation of the folding part is performed by any one process of wet etching, polishing, laser forming, and masking processes, by a process of combining the at least two process thereof, or by the wet etching, the laser forming, or the masking process, which is followed by the polishing process.

7. The cover window of claim 1, wherein the thickness ($t_1$) of the folding part is 20 to 50 μm, and the cover window satisfies a minimum curvature radius of 0.5 mm to 2.1 mm as measured during folding.

8. The cover window of claim 1, wherein the folding part is filled with a transparent resin material so that the cover window can be bonded to a total surface of a display panel without an empty space therebetween.

9. The cover window of claim 8, wherein the transparent resin material is an optical clear resin (OCR).

10. The cover window of claim 8, wherein transparent resin material filled in the folding part of the back surface of the cover window is softer than transparent resin material filled in the folding part of the front surface thereof.

11. The cover window of claim 10, wherein the folding part is filled with the transparent resin material, and a total surface of the cover window is continuously coated with the transparent resin material on an upper side of the folding part.

12. The cover window of claim 8, wherein a bonding film is further provided on a surface or opposite surfaces of the cover window.

13. The cover window of claim 12, wherein the bonding film is an anti-splinter film (ASF).

14. The cover window of claim 8, wherein the folding part is filled with the transparent resin material, and a total surface of the cover window is continuously coated with the transparent resin material on an upper side of the folding part.

15. The cover window of claim 14, wherein a functional coating layer is further provided on a surface or opposite surfaces of the cover window.

16. The cover window of claim 15, wherein the functional coating layer is provided in a single layer or multiple layers.

17. The cover window of claim 16, wherein the functional coating layer is provided on opposite surfaces of the cover window, and the functional coating layer provided on a front surface of the cover window is a strength reinforcement layer, and the functional coating layer provided on a back surface of the cover window is an elastic reinforcement layer.

18. The cover window of claim 17, wherein when the functional coating layer provided on the front surface of the cover window is provided in multiple layers, the functional coating layer is formed of a material getting harder upward.

19. The cover window of claim 18, wherein a functional coating layer provided on an uppermost layer is given an anti-finger (AF) or an anti-reflective (AR) function.

* * * * *